US005500475A

United States Patent [19]

Eicken et al.

[11] Patent Number: 5,500,475
[45] Date of Patent: Mar. 19, 1996

[54] POLYURETHANE-BASED THICKENERS

[75] Inventors: Ulrich Eicken, Korschenbroich; Herbert Fischer, Duesseldorf; Wolfgang Gress, Wuppertal; Rainer Hoefer, Duesseldorf; Doris Oberkobusch, Dusseldorf; Ludwig Schieferstein, Ratingen, all of Germany

[73] Assignee: Henkel Kommanditgesellschaft auf Aktien, Duesseldorf, Germany

[21] Appl. No.: 240,729

[22] PCT Filed: Nov. 4, 1992

[86] PCT No.: PCT/EP92/02526

§ 371 Date: May 10, 1994

§ 102(e) Date: May 10, 1994

[87] PCT Pub. No.: WO93/10166

PCT Pub. Date: Mar. 22, 1989

[30] Foreign Application Priority Data

Nov. 13, 1991 [DE] Germany .............. 41 37 247.6

[51] Int. Cl.⁶ ............... C08J 3/00; C08K 3/20; C08L 75/00; C08G 18/28
[52] U.S. Cl. ............... 524/591; 524/507; 524/839; 528/60; 528/65; 528/73

[58] Field of Search .............. 524/591, 507, 524/839; 528/60, 65, 73

[56] References Cited

U.S. PATENT DOCUMENTS

| 4,079,028 | 3/1978 | Emmons et al. | 260/29.6 NR |
|---|---|---|---|
| 4,155,892 | 5/1979 | Emmons et al. | 260/29.2 TN |
| 4,499,233 | 2/1985 | Tetenbaum et al. | 524/591 |

FOREIGN PATENT DOCUMENTS 0307775  3/1989  European Pat. Off. .

Primary Examiner—Paul R. Michl
Assistant Examiner—Patrick Niland
Attorney, Agent, or Firm—Wayne C. Jaeschke; John Daniel Wood; Daniel S. Ortiz

[57] ABSTRACT

Provided are thickeners based on an aqueous preparation of nonionic, water-dispersible or water-soluble polyurethanes, to their production and to their use. The nonionic, water-dispersible or water-soluble polyurethanes are obtainable by reaction of polyfunctional isocyanates with polyether polyols, monohydric alcohols and, if desired, polyhydric alcohols, wherein the monohydric alcohols contain at least one other polar group. Also provided is a process for the production of such thickeners. The thickeners are particularly suitable for thickening emulsion paints.

36 Claims, No Drawings

POLYURETHANE-BASED THICKENERS

BACKGROUND OF THE INVENTION

1. Field of the Invention

This invention relates to thickeners based on an aqueous preparation of nonionic, water-dispersible or water-soluble polyurethanes, to their production and to their use.

2. Discussion of Related Art

Associative polyurethane-based thickeners are linear or branched nonionic polymers with hydrophilic and hydrophobic segments. They are being increasingly used as a substitute for or in addition to the cellulose ethers traditionally used as thickeners in paints and lacquers and also the alkali-soluble polyacrylates. Polyurethane thickeners have the following advantages over these traditional thickeners:

lower viscosity on incorporation less tendency to splash during spread coating better color characteristics higher gloss through less flocculation lower sensitivity of the coatings to water less vulnerability to microbial attack low intrinsic viscosity in the made-up form and, hence, good dosability a good thickening effect in the dispersions to be thickened a minimal reduction in the viscosity of the thickened dispersions under shear, substantially newtonian flow behavior.

Polyurethane thickeners of the type in question belong to the prior art. Their composition, production and use are described, for example, in U.S. Pat. No. 4,155,892. According to this document, the polyurethanes are produced by reaction of the following components:

(a) at least one water-soluble polyether polyol (b) at least one water-insoluble organic polyisocyanate (c) at least one monofunctional hydrophobic organic compound selected from compounds containing an isocyanate-reactive hydrogen atom and organic monoisocyanates and (d) at least one polyhydric alcohol or polyhydric ether alcohol.

U.S. Pat. No. 4,079,028 relates to similar subject matter.

SUMMARY OF THE INVENTION

The problem addressed by the present invention was to provide polyurethane-based thickeners which would show a distinct improvement in the above-mentioned advantages of polyurethane thickeners over the polyurethane thickeners known from the prior art. More particularly, an increase in the viscosity of the thickened product would be obtained with the same quantity of thickener despite the relatively low intrinsic viscosity of the thickeners in their made-up form. In addition, a further approximation to newtonian flow behavior would be achieved. In addition, there would be no need to use solvents in the production of the thickeners.

According to the invention, this problem has been solved by thickeners based on an aqueous preparation of nonionic, water-dispersible or water-soluble polyurethanes obtainable by reaction of (a) polyfunctional isocyanates with (b) polyether polyols, (c) monohydric alcohols and (d) if desired, polyhydric alcohols, characterized in that the monohydric alcohols (c) contain at least one other polar group.

DETAILED DESCRIPTION OF THE INVENTION

As already mentioned, polyurethane-based thickeners belong to the prior art, cf. for example U.S. Pat. No. 4,155,892. The main difference between this U.S. patent and the present application is that the at least monofunctional, hydrophobic organic compound containing an isocyanate-reactive hydrogen atom is replaced in accordance with the present invention by monohydric alcohols containing at least one other polar group. A group is polar when its characteristic electron distribution provides the molecule with a considerable electrical dipole moment. It preferably contains at least 2 hetero atoms. Whereas the hydroxyl group of the monohydric alcohols is reactive to isocyanates, the additional polar groups are not intended to show such reactivity. Except for this difference, all other disclosures in U.S. Pat. No. 4,155,892 largely apply to the present application also, so that this U.S. patent must be counted as part of the disclosure of the present application.

Suitable polyether polyols (b) are, for example, the polymerization products of ethylene oxide, propylene oxide and/or butylene oxide, copolymerization or graft polymerization products thereof and polyethers obtained by condensation of polyhydric alcohols or mixtures thereof and polyethers obtained by alkoxylation of polyhydric alcohols, amides, polyamides and aminoalcohols. These polyether polyols are preferably so strongly hydrophilic that they are soluble in water. Polyether polyols at least predominantly containing polyalkylene glycols, more particularly polyethylene glycol and/or polypropylene glycol, are particularly suitable for the production of the polyurethanes according to the invention. Particularly good results are obtained when these polyalkylene glycols have an average content of alkoxy units of 20 to 400 and, more particularly, in the range from 160 to 210. If the suitable diols have the following general formula:

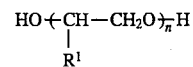

n may assume a value of 20 to 400 and $R^1$ may be H or $CH_3$.

Diols in which R=H and n=130 to 230 and, more particularly, 160 to 210 are preferred.

In one preferred embodiment, up to 90% by weight of the polyurethane molecule consists of the diol units mentioned above.

Suitable polyfunctional isocyanates (a) are any polyfunctional aromatic, alicyclic and aliphatic isocyanates. Suitable polyfunctional isocyanates preferably contain on average 2 to at most 4 NCO groups. The following are mentioned as examples of suitable isocyanates: 1,5-naphthylene diisocyanate, 4,4'-diphenylmethane diisocyanate (MDI), hydrogenated MDI ($H_{12}MDI$), xylylene diisocyanate (XDI), tetramethyl xylene diisocyanate (TMXDI), 4,4'-diphenyl dimethylmethane diisocyanate, dialkyl and tetraalkyl diphenylmethane diisocyanate, 4,4'-dibenzyl diisocyanate, 1,3-phenylene diisocyanate, 1,4-phenylene diisocyanate, the isomers of tolylene diisocyanate (TDI), optionally in admixture, 1-methyl-2,4-diisocyanatocyclohexane, 1,6-diisocyanato-2,2,4trimethylhexane, 1,6-diisocyanato-2,4,4-trimethylhexane, 1-isocyanatomethyl-3-isocyanato-1,5,5-trimethylcyclohexane, chlorinated and brominated diisocyanates, phosphorus-containing diisocyanates, 4,4'-diisocyanatophenyl perfluoroethane, tetramethoxybutane-1,4-diisocyanate, butane-1,4-diisocyanate, hexane-1,6-diisocyanate (HDI), dicyclohexylmethane diisocyanate, cyclohexane-1,4-diisocyanate, ethylene diisocyanate, phthalic acid bis-isocyanatoethyl ester; polyisocyanates containing reactive halogen atoms, such as 1-chloromethylphenyl-2,4-diisocyanate, 1-bromomethylphenyl-2,6-diisocyanate, 3,3-bis-chloromethylether- 4,4'-diphenyl diisocyanate. Sulfur-containing polyisocyanates are obtained, for example, by reaction of 2 moles of hexamethylene diisocyanate with 1 mole of thiodiglycol or dihydroxydihexyl sulfide. Other important diisocyanates are trimethyl hexamethylene diisocyanate, 1,4-diisocyanatobutane, 1,2-diisocyanatododecane and dimer fatty acid diisocyanate. Also of interest are partly masked polyisocyanates which enable self-crosslinking polyurethanes to be formed, for example dimeric tolylene diisocyanate, or polyisocyanates partly reacted with, for example, phenols, tertiary butanol, phthalimide, caprolactam.

In one particular embodiment, the isocyanate component partly contains dimer fatty acid isocyanate. Dimer fatty acid is a mixture of predominantly $C_{36}$ dicarboxylic acids which is obtained by thermal or catalytic dimerization of unsaturated $C_{18}$ monocarboxylic acids, such as oleic acid, tall oil fatty acid or linoleic acid. Dimer fatty acids have long been known to the expert and are commercially obtainable. Dimer fatty acid can be reacted to form dimer fatty acid isocyanates. Technical dimer fatty acid diisocyanate contains on average at least two and less than three isocyanate groups per molecule of dimer fatty acid. In a preferred embodiment of the invention, the polyfunctional isocyanates (a) used for the production of the polyurethanes at least predominantly contain dicyclohexylmethane diisocyanate and/or tetramethyl xylene diisocyanate (TMXDI). Particularly good results are obtained with TMXDI, especially since it is easier to handle in the conduct of the reaction. To introduce branches into the polyurethane molecule, it can be of advantage to use small quantities of trifunctional isocyanates.

As already mentioned, the monohydric alcohols (c)—in addition to their isocyanate-reactive OH group—contain another polar group which is inert to isocyanates. In a preferred embodiment of the invention, the monofunctional alcohols (c) used for the production of the polyurethanes, which have the general formula $R^2$—OH, contain up to 20 aliphatic carbon atoms in the moiety $R^2$ and an ester, amide and/or oxazoline group as an additional polar group. Particularly good results are obtained when (c) at least predominantly contains ricinoloxazoline and/or castor oil fatty acid methyl ester. Of these two compounds, castor oil fatty acid methyl is preferred.

Although, in principle, the OH/NCO ratio can be varied over a wide range, a stoichiometric ratio or a ratio with a slight excess of OH groups of around 5 to 10% is preferred. The ratio is preferably 1:1. In addition, it is pointed out that the OH-functional components can also be at least partly replaced by analogous amine compounds.

In one embodiment of the invention, the polyurethane molecules are linear, i.e. do not have any branches. They correspond to the following general formula:

$R^1$ is H or $CH_3$, preferably H, $R^2$ is the residue of the monohydric alcohol (c) reacted with isocyanate $R^3$ is the residue of the diisocyanate reacted with isocyanate-reactive OH groups n=20 to 400 and m=1 to 10, preferably 1 to 5 (the best results being obtained where m=1 or 2).

Polyhydric alcohols (d) may advantageously be used as a further component for the production of the polyurethanes. Suitable polyhydric alcohols (d) are dihydric to tetrahydric alcohols. To produce branches in the buildup of the polyurethane molecule, at least trihydric starting substances should be used. Polyurethanes branched in this way as a basis for the thickeners according to the invention represent a preferred embodiment of the invention. In this case, the polyhydric alcohols (d) preferably contain at least predominantly trihydric alcohols, such as glycerol for example. The preferred trihydric alcohol according to the invention is trimethylol propane (TMP). However, branches can also be introduced in the buildup of the polyurethane molecule by the use of isocyanates with a functionality of more than 2, preferably triisocyanates. To optimize the performance properties of the thickeners, it is preferred to limit branchings such as these to a certain region within the polyurethane molecule. The content of OH groups introduced by the polyhydric alcohols, based on the total quantity of OH groups, is preferably 0 to 50%. Particularly good properties are obtained with thickeners where this range is limited to 25 to 35. The same also applies in cases where the branches are introduced by polyfunctional isocyanates. The molecule can of course also be branched by more than dihydric alcohols and, at the same time, by more than difunctional isocyanates. In this case, the sum total of these compounds or rather their functional groups should not be outside the ranges mentioned.

The polyurethanes on which the thickeners according to the invention are based preferably have an average molecular weight of 5,000 to 50,000. For particular applications, it can be of advantage to keep the upper limit of the average molecular weight below 10,000.

The present invention also relates to a process for the production of the thickeners according to the invention. To this end, the reaction components (b), (c) and if desired (d) may be reacted with (a) in any order. In a preferred embodiment, however, all the components are reacted together, i.e. at the same time. The reaction may be carried out in solvents which are inert to isocyanates, such as for example toluene, methylethyl ketone and/or N-methyl pyrrolidone. However, the reaction is preferably carried out in the absence of solvents in the melt, particularly when TMXDI is used as the isocyanate. The reaction temperature is in the range from about 60 to 140° C. and preferably in the range from 70 to 100° C. For example, a mixture of propanediol and water may be added to the melt in portions to complete the thickeners. After the dispersion or solution has been homogeneously stirred, it may be packed in containers after cooling. The thickeners according to the invention preferably have a polyurethane content of 30 to 45% by weight and, more particularly, 40 to 43% by weight. Catalysts

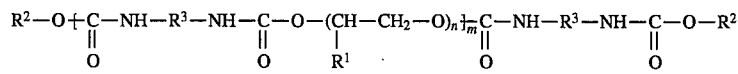

in which suitable for polyurethane reactions, such as dibutyl tin dilaurate (DBTL) for example, may be used in typical catalytically active quantities for the reaction.

The present invention also relates to the use of the thickeners according to the invention. The thickeners are preferably used as such. Their range of application essentially encompasses the thickening of aqueous dispersions. They are particularly suitable for thickening emulsion paints.

EXAMPLES

Production of thickener No. 1:

160 g of polyethylene glycol 8,000 and 14.7 g of Edenor® Me Ri (castor oil fatty acid methyl ester, Henkel KGaA) were initially introduced into a reactor, heated to 120° C. and freed from water in vacuo. After cooling to 70° C., 9.8 g of tetramethyl xylene diisocyanate and 0.15 g of dibutyl tin dilaurate (DBTL) were added until no more NCO groups could be detected in the IR spectrum. The reaction mixture was stirred for 6 h at 70° C. If the reaction is carried out at 120° C., the reaction time is shortened to around 2 h.

This production example is representative of all the following Examples 2 to 16. Where polyhydric alcohols (d) are used, they are also introduced first.

Application Example:

| | Emulsion paint: Formulation | |
|---|---|---|
| 51.0 g | 1,2-Propane diol | |
| 45.5 g | Water | |
| 1.0 g | Hydropalat 1667 | (dispersant, Henkel KGaA) |
| 126.0 g | Kronos RN 56 | (rutile, stabilized with Al, Si compounds, Kronos Titan GmbH) |
| 1.0 g | Dehydran 130 | (foam inhibitor, Henkel KGaA) |
| 8.5 g | Texanol | (isobutyric acid-2,2,4-trimethyl-3-hydroxypentyl ester, Eastman Kodak) |
| 4.0 g | Dehygant LFM | (preservative, Henkel KGaA) |
| 1.0 g | Ammonia conc. | |
| 252.0 g | Primal AC 507 | (dispersion, Rohm & Haas) |

An emulsion paint is prepared from these ingredients in accordance with the prior art and thickened with 30 g of a 35% solution of the product of Example 1 in 1,2-propanediol/H20 60:40.

A 35% by weight solution of the product of Example 1 in 1,2-propanediol/H20 (60:40) has a viscosity η of 5.2 Pa·s (Brookfield, #4, 20 r.p.m., 20° C.). A product of Rohm & Haas for thickening paints and lacquers (Primal® RM-8) has a viscosity η of 25 Pa.s in the form of a solution of equal concentration.

The viscosity was also compared with and without shearing. To this end, the product of Example 1 according to the invention and the best commercial products were added in equal quantities to the emulsion paint (see above description) and the viscosity (n) was determined as a function of the speed gradient (D) in a Haake Rotovisco RV 20, MS rotational viscosimeter. The curves obtained had the following η values at D=20 sec$^{-1}$ and 650 sec$^{-1}$.

| Thickener | $\eta_{20}$ [Pa · s] | $\eta_{650}$ [Pa · s] |
|---|---|---|
| Product of Example 1 | Approx. 2.5 | 0.73 |
| Primal ® RM-8 (Rohm & Haas) | Approx. 2.5 | 0.35/0.59 (2 different batches) |
| Borchigel ® L 75 (a PU-based thickened for emulsion paints, a product of Borchers) | Approx. 4.0 | 0.50 |
| Ser-Ad ® FX 1010 (Servo) based on PU | Approx. 1.0 | 0.22 |

The comparison shows that viscosity behavior with and without shearing $\eta_{20}/\eta_{650}$ is at its lowest and hence most balanced where the thickener according to the invention is used.

TABLE

Polyurethane thickeners

| Example No. | Diisocyanate (moles) | PEG (moles) | Monohydric alcohol (moles) | Other alcohol (moles) | $\eta^1$ [mpas] | Solids content [% by weight] | $\eta^2$ [Pas] |
|---|---|---|---|---|---|---|---|
| 1 | m-TMXDI (2) | 8000(1) | Edenor ME RI (2) | — | 5200 | 35 | 0.73 |
| 2 | Desmodur ® W(2) | 8000(1) | Castor oil fatty methyl ester (Edenor ® Me Ri) (2) | acid | 26800 | 35 | 0.73 |
| 3 | m-TMXDI (18) | 8000(13) | Ricinoloxazoline (4) | TMP(2) | 59000 | 35 | 0.34 |
| 4 | m-TMXDI (2) | 8000(1) | Ricinoloxazoline (2) | — | 7000 | 35 | 0.55 |
| 5 | m-TMXDI (2) | 8000(1) | Castor oil fatty fatty acid (2) | — | 600 | 35 | 0.11 |
| 6 | m-TMXDI (2) | 6000(1) | Ricinoloxazoline (2) | — | 2200 | 35 | 0.39 |
| 7 | m-TMXDI (3) | 8000(2) | Ricinoloxazoline (2) | — | 15000 | 35 | 0.51 |
| 8 | m-TMXDI (5) | 8000(4) | Ricinoloxazoline (2) | — | 45500 | 35 | 0.43 |
| 9 | m-TMXDI (2) | 8000(1) | Castor oil fatty acid butyl ester (2) | — | 8100 | 35 | 0.39 |
| 10 | m-TMXDI (2) | 12000(1) | Edenor ME RI (2) | — | 12500 | 35 | 0.44 |
| 11 | m-TMXDI | 8000(2,2) | Edenor ® ME RI(1) | — | 10000 | 34.3 | 0.58 |
| 12 | m-TMXDI | 8000(2,4) | Edenor ® ME RI(1) | — | 12600 | 35.5 | 0.56 |
| 13 | m-TMXDI | 8000(1) | Edenor ® ME RI(1,7) | — | 2300 | 34.6 | 0.58 |
| 14 | m-TMXDI | 8000(10,3) | Edenor ® ME RI(8,6) | TMP (1) | 5300 | 36.1 | 0.66 |
| 15 | m-TMXDI | 8000(1,3) | Edenor ® ME RI(1,1) | TMP (1) | 7700 | 35.7 | 0.66 |
| 16 | m-TMXDI | 8000(2,6) | Edenor ® ME RI(2,1) | TMP (1) | 15200 | 43.0 | 0.87 |

TABLE-continued

Polyurethane thickeners

| Example No. | Diisocyanate (moles) | PEG (moles) | Monohydric alcohol (moles) | Other alcohol (moles) | $\eta^1$ [mpas] | Solids content [% by weight] | $\eta^2$ [Pas] |
| --- | --- | --- | --- | --- | --- | --- | --- |

$\eta^{1)}$: Brookfield viscosity (# 4, 20 r.p.m., 20° C.) of a 35% by weight solution of the product in 1,2-propylene diol/H$_2$O (60:40)
$\eta^{2)}$: Viscosity of the thickened emulsion paint at 650 sec$^{-1}$, as measured in a Haake Rotovisko RV 20, M 5 (=$\eta_E$)
m-TMXDI m-Tetramethyl xylene diisocyanate (Cyanamid)
Desmodur ® W: Dicyclohexylmethane diisocyanate (Bayer AG)
TMP: Trimethylol propane
Edenor ® Me Ri: Castor oil fatty acid methyl ester (Henkel KGaA)
PEG: Polyethylene glycol of average molecular weight
Ricinoloxazoline: 2-(11-Hydroxy-9-heptadecenyl)-oxazoline
Examples 11 to 16: OH/NCO = 1:0.997

We claim:

1. A composition of matter useful as a thickener comprising an aqueous preparation of a nonionic, water-dispersible or water-soluble polyurethane obtained from the reaction of a reaction mixture comprised of a polyfunctional isocyanate, a polyether polyol and a monohydric alcohol, wherein said monohydric alcohol contains at least one polar group which is not reactive to isocyanates and said monohydric alcohol is selected from the group consisting of castor oil fatty acid esters and monohydric alcohols containing an oxazoline group.

2. A composition as claimed in claim 1 wherein said polyether polyol at least predominantly contains a polyalkylene glycol.

3. A composition as claimed in claim 2 wherein said polyalkylene glycol has an average content of alkoxy units of 20 to 400.

4. A composition as claimed in claim 2 wherein said polyalkylene glycol has an average content of alkoxy units of 160 to 210.

5. A composition as claimed in claim 1 wherein said polyether polyol at least predominantly contains polyethylene glycol and/or polypropylene glycol.

6. A composition as claimed in claim 5 wherein said polyalkylene glycol has an average content of alkoxy units of 20 to 400.

7. A composition as claimed in claim 5 wherein said polyalkylene glycol has an average content of alkoxy units of 160 to 210.

8. A composition as claimed in claim 1 wherein said monohydric alcohol has the general formula $R^2$—OH, wherein $R^2$ contains up to 20 aliphatic carbon atoms and a castor oil fatty acid group or an oxazoline groups as said polar group which is not reactive to isocyanate.

9. A composition as claimed in claim 1 wherein said monohydric alcohol at least predominantly contains ricinoloxazoline.

10. A composition as claimed in claim 1 wherein said monohydric alcohol at least predominantly contains castor oil fatty acid methyl ester.

11. A composition as claimed in claim 1 wherein said polyfunctional isocyanate at least predominantly contains dicyclohexylmethane diisocyanate.

12. A composition as claimed in claim 1 wherein said polyfunctional isocyanate at least predominantly contains tetramethyl xylene diisocyanate.

13. A composition as claimed in claim 1 wherein said nonionic, water-dispersible or water-soluble polyurethane corresponds to the following general formula:

$$R^2-O+C-NH-R^3-NH-C-O-(CH-CH_2-O)_n\tfrac{1}{m}C-NH-R^3-NH-C-O-R^2$$
$$\phantom{R^2-O+}\overset{\|}{O}\phantom{-NH-R^3-NH-}\overset{\|}{O}\phantom{-O-(CH-}\underset{R^1}{|}\phantom{CH_2-O)_n\tfrac{1}{m}}\overset{\|}{O}\phantom{-NH-R^3-NH-}\overset{\|}{O}$$

wherein:
$R^1$ is hydrogen or methyl,
$R^2$ is the residue of said monohydric alcohol,
$R_3$ is the residue of said polyfunctional isocyanate,
n is from 20 to 400, and
m is from 1 to 10.

14. A composition as claimed in claim 13 wherein $R^1$ is hydrogen.

15. A composition as claimed in claim 13 wherein n is from 160 to 210.

16. A composition as claimed in claim 13 wherein m is from 1 to 5.

17. A composition as claimed in claim 13 wherein m is 1 or 2.

18. A composition as claimed in claim 13 wherein $R^1$ is hydrogen, n is from 160 to 210, and m is 1 or 2.

19. A composition as claimed in claim 1 wherein said reaction mixture further comprises a polyhydric alcohol.

20. A composition as claimed in claim 19 wherein said polyhydric alcohol at least predominantly contains trihydric alcohols.

21. A composition as claimed in claim 19 wherein said polyhydric alcohol is trimethylolpropane.

22. A composition as claimed in claim 19 wherein in that the content of OH groups introduced by said polyhydric alcohol in said reaction mixture, based on the total quantity of OH groups in said reaction mixture, is up to 50%.

23. A composition as claimed in claim 1 wherein the OH:NCO ratio of said reaction mixture is 1:1.

24. A composition as claimed in claim 1 wherein said polyurethane has a molecular weight from 5,000 to 50,000.

25. A composition as claimed in claim 1 wherein said composition is comprised of said polyurethanes in an amount of 30% to 45% by weight.

26. A composition as claimed in claim 1 wherein said composition is comprised of said polyurethanes in an amount of 40% to 43% by weight.

27. A composition of matter useful as a thickener comprising an aqueous preparation of a nonionic, water-dispersible or water-soluble polyurethane obtained from the reaction of a reaction mixture comprised of a polyfunctional isocyanate, a polyether polyol and a monohydric alcohol, wherein said monohydric alcohol is selected from the group consisting of ricinoloxazoline and castor oil fatty acid methyl ester.

28. In a method of thickening an emulsion paint, the improvement comprising thickening said emulsion paint with a composition as claimed in claim 1.

29. A process for the production of a nonionic, water-dispersible or water-soluble polyurethane comprising reacting a reaction mixture comprised of a polyfunctional isocyanate, a polyether polyol and a monohydric alcohol, wherein said monohydric alcohol contains at least one polar group which is not reactive to isocyanates and said monohydric alcohol is selected from the group consisting of castor oil fatty acid esters and monohydric alcohols containing an oxazoline group.

30. A process as claimed in claim 29 wherein said reacting is carried out in the absence of solvents.

31. A process as claimed in claim 29 wherein said monohydric alcohol is selected from the group consisting of ricinoloxazoline and castor oil fatty acid methyl ester.

32. A process as claimed in claim 29 wherein said monohydric alcohol at least predominantly contains ricinoloxazoline.

33. A process as claimed in claim 29 wherein said monohydric alcohol at least predominantly contains castor oil fatty acid methyl ester.

34. A method as claimed in claim 28 wherein said monohydric alcohol is selected from the group consisting of ricinoloxazoline and castor oil fatty acid methyl ester.

35. A method as claimed in claim 28 wherein said monohydric alcohol at least predominantly contains ricinoloxazoline.

36. A method as claimed in claim 28 wherein said monohydric alcohol at least predominantly contains castor oil fatty acid methyl ester.

* * * * *

UNITED STATES PATENT AND TRADEMARK OFFICE
CERTIFICATE OF CORRECTION

PATENT NO. : 5,500,475
DATED : Mar. 19, 1996
INVENTOR(S) : Eicken et al.

It is certified that error appears in the above-identified patent and that said Letters Patent is hereby corrected as shown below:

On the title page, item [87]:

The PCT Pub. Date should be changed from "Mar. 22, 1989" to --May 27, 1993--.

Signed and Sealed this

Twenty-third Day of December, 1997

Attest:

BRUCE LEHMAN

*Attesting Officer*  *Commissioner of Patents and Trademarks*